United States Patent [19]

Durand et al.

[11] 4,271,323

[45] Jun. 2, 1981

[54] PROCESS FOR HYDROGENATING UNSATURATED COMPOUNDS

[75] Inventors: Daniel Durand, Rueil-Malmaison; Gerard Hillion, Franconville; Christian Lassau, Villepreux; Lucien Sajus, Croissy sur Seine, all of France

[73] Assignee: Institut Francais du Petrole, Rueil-Malmaison, France

[21] Appl. No.: 621,416

[22] Filed: Oct. 10, 1975

Related U.S. Application Data

[63] Continuation-in-part of Ser. No. 467,900, May 8, 1974, abandoned.

[30] Foreign Application Priority Data

| | | |
|---|---|---|
| May 8, 1973 [FR] | France | 73 16619 |
| Jul. 13, 1973 [FR] | France | 73 25933 |
| Nov. 5, 1973 [FR] | France | 73 39290 |

[51] Int. Cl.$^3$ ............... C07C 5/10; C07C 5/02; C07C 85/12; C07C 29/19
[52] U.S. Cl. ................ 568/816; 564/448; 564/415; 564/490; 564/491; 568/835; 585/275; 585/276; 585/277; 585/250; 585/266; 585/379; 585/700; 585/274; 252/451; 252/431 R; 260/409; 525/338; 525/339; 568/435; 568/687; 568/840; 568/396; 568/28; 564/463
[58] Field of Search ............ 200/683.9; 260/631, 260/631 R, 409; 252/429 C, 451 R, 451 C; 568/816, 835; 564/448, 490, 415, 491; 585/275, 276, 266, 277, 250, 379, 700

[56] References Cited

U.S. PATENT DOCUMENTS

| | | | |
|---|---|---|---|
| 3,412,174 | 11/1968 | Kroll | 260/683.9 |
| 3,454,644 | 7/1969 | Dewhirst | 260/570.9 |
| 3,591,649 | 7/1971 | Kroll et al. | 260/683.9 |
| 3,591,656 | 7/1971 | Kroll | 260/683.9 |
| 3,784,481 | 1/1974 | Lassau et al. | 252/429 C |
| 3,943,067 | 3/1976 | Chan et al. | 252/429 C |
| 3,946,087 | 3/1976 | Hillion et al. | 260/631 H |

FOREIGN PATENT DOCUMENTS

1904613 9/1969 Fed. Rep. of Germany ...... 260/583 K

*Primary Examiner*—Howard T. Mars
*Assistant Examiner*—James H. Reamer
*Attorney, Agent, or Firm*—Millen & White

[57] ABSTRACT

Process for hydrogenating unsaturated compounds in the liquid phase in the presence of a soluble catalyst obtained by reacting an organometal derivative or a metal hydride with a synergistic mixture of (a) a compound of zinc, zirconium, manganese, molybdenum, or iron and (b) a nickel or cobalt compound.

21 Claims, No Drawings

PROCESS FOR HYDROGENATING UNSATURATED COMPOUNDS

This application is a continuation-in-part of our co-pending patent application Ser. No. 467,900 filed May 8, 1974 now abandoned.

This invention concerns a new process for hydrogenating unsaturated hydrocarbons in the liquid phase, making use of a soluble catalyst obtained by reacting a reducing agent with a mixture of at least two different metal compounds.

By unsaturated compounds, it is meant, in particular, the hydrocarbons having from 2 to 40, for example from 2 to 20 carbon atoms per molecule, irrespective of the number and the type of the unsaturations, particularly the acetylenic and polyolefinic hydrocarbons and certain aromatic hydrocarbons and the unsaturated compounds further containing, in addition to the carbon and oxygen atoms, one or more oxygen or nitrogen atoms, such as the saturated and unsaturated ketones, the unsaturated esters, the saturated and unsaturated aldehydes, the unsaturated alcohols and ethers, the oximes, the saturated or unsaturated nitriles, the unsaturated sulfones, the imines, the unsaturated amines or the phenols.

Unsaturated polymers, for example, polybutadiene or polyisoprene, may also be hydrogenated.

As examples of hydrogenizable compounds, we can mention butadiene, cyclododecatriene, vinylacetylene, cyclopentene, butenes, benzene, alkylbenzenes, alkyldiphenyles, alkylnaphthalenes, particularly toluene, xylene, methylnaphthalene, propionitrile, adiponitrile, oleonitrile, 1,4-dicyanobutene, benzonitrile, vinylethylsulfone, vinylethylketone, unsaturated fatty oils, ethyl linolenate, phenol, biphenol A, para-tert.butyl phenol, cresols and pinene.

It is already known to prepare active hydrogenation catalysts by contacting a compound of a transition metal with a reducing agent, for example a trialkylaluminum compound. Instead of a single metal compound, a mixture of metal compounds can be used, for example a mixture of a cobalt salt and a nickel salt. The use of such a mixture does not result in any particular advantage.

It has now been found that specific associations of metal compounds result in an unexpected synergic effect.

We have discovered, and this is the object of the present invention, that it is possible to manufacture an excellent catalyst for hydrogenating unsaturated compounds in the homogeneous phase or substantially homogeneous phase, by reacting a reducing agent with compounds of at least two different metals which, when reacted separately with the same reducing agent, produce catalysts which have but a reduced activity or no activity at all. This reaction is carried out in a solvent which may be an inert solvent or the liquid compound to be hydrogenated.

More particularly, the catalyst according to the invention is obtained by contacting (a) a compound of a selected metal from groups 1B to 7B or of iron and (b) a compound of nickel and/or cobalt with (c) a reducing agent. The above-mentioned groups are those of the periodic classification of the elements by Ch. Hodgman, Handbook of Chemistry and Physics, 1959.

In order to obtain a high efficiency, we prefer to make use of iron, zinc, zirconium manganese and/or molybdenum compounds as compounds (a).

By metal compound and in particular by iron, zinc, zirconium, manganese, molybdenum, cobalt or nickel compound, we mean either a definite compound such as a halide, an alkoxide, an acetylacetonate or a carboxylate or the product of the reaction of one or more reducing agents with said definite compounds.

As examples of definite compounds, we can mention iron dichloride, iron trichloride, iron acetylacetonates, cobalt acetylacetonates, nickel acetylacetonates, molybdenum acetylacetonates, zirconium acetylacetonates, manganese acetylacetonates, zinc acetylacetonates, nickel dichloride, cobalt dichloride, cobalt dibromide, cobalt diacetate, bis-pyridinodichloronickel, bis-triphenylphosphinedichloronickel and the organic acid carboxylates having from 2 to 20 carbon atoms such as iron, zinc, manganese, molybdenum, zirconium, nickel and/or cobalt naphthenate, stearate, ethylhexanoate, benzoate, decanoate and oleate. These definite compounds are generally used in solution in a solvent which may be, for example, a saturated or unsaturated hydrocarbon or a mixture of such hydrocarbons or an ether. Accordingly, we prefer the soluble metal compounds, particularly the carboxylates and the acetylacetonates.

By reducing compounds, we mean the organometallic compounds or the hydrides of lithium, sodium, aluminum or the mixed compounds of aluminum and sodium or lithium and their derivatives. These compounds usually contain at least one carbon-metal or hydrogen-metal bond. For example, we can use a compound of the formula $AlR_3$, in which R is an alkyl group containing from 1 to 12 carbon atoms.

As non-limitative examples, we can mention butyl lithium, sodium ethylate, naphthyl sodium, triethylaluminum, chlorodiethylaluminum, triisobutylaluminum, diethyltert.butoxyaluminum, diethoxyethylaluminum, di-isobutylaluminum hydride, mixed lithium and aluminum hydride, mixed sodium and aluminum hydride and their derivatives by substitution either with a hydrocarbon radical or with an alkoxy group. In these substitution derivatives, the maximum substitution degree is 3 in order to retain at least one hydrogen atom.

The reducing compound may be used either pure or dissolved in a solvent, for example a hydrocarbon or an ether.

The mode of preparation of the catalyst is not critical and we may, for example, carry out the reduction of the metal compounds and, in particular, of the iron, nickel and/or cobalt compounds either simultaneously or separately. We however prefer the first method. We may, for example, proceed by pouring the metal salt solutions, in particular iron, nickel and/or cobalt salt solutions into a solution containing the total amount of reducing agent, or by pouring the solution containing the reducing agent into the solution containing the metal salts and, in particular, the iron, nickel and/or cobalt salts, or still by pouring the solution containing the reducing agent into a solution containing a first metal salt and then by adding a solution containing a second metal salt. We prefer to prepare the catalyst in an inert solvent in the absence of the compound to be hydrogenated. We may however, in some cases, prepare an active catalyst in the presence of the compound to be hydrogenated, for example a phenol, provided that we introduce at first the metal compound (a), for example the iron compound, then the nickel and/or cobalt compound, or that we introduce, immediately after the nickel and/or cobalt compound, the metal compound (a) and, in particular, the iron compound.

The ratio of the atomic amount of metal (a) to that of nickel and/or cobalt is generally from 10:1 to 0.01:1, preferably from 5:1 to 0.05:1. The ratio of the number of moles of the reducing agent to the number of atoms of the metal (compound of metal (a) plus compound of nickel and/or cobalt) is generally from 0.5:1 to 10:1, preferably from 1.5:1 and 6:1.

The preparation of the catalyst may be conducted for example within the range from 0° to 200° C., preferably from 20° to 160° C.

During the use of the resulting catalyst, the hydrogen pressure may range from 0.1 to 100 bars, preferably from 2 to 50 bars.

The reaction temperature may range from 0° C. to 300° C., it is preferably from +10° to +250° C.

Generally the concentration of the catalyst is low and may vary from 5 to 1,500 ppm, preferably from 20 to 1,000 ppm, by weight of metal (a+b) with respect to the total feed charge.

The ratio by volume of the catalyst solution to the total reaction volume is generally from 0.001% to 10%.

Depending on the operating conditions, the hydrogenation may be partial or total; in particular, as regards a hydrogenation reaction carried out in several successive steps, a selective partial hydrogenation may be obtained.

The catalyst may be used either in a batch or a continuous process.

Synergy between nickel and/or cobalt compounds and the other metal compounds is not always present.

Synergy is present, at least for specific hydrogenations, as concerns:
a nickel salt and an iron salt
a cobalt salt and an iron salt
a nickel salt and a zinc salt
a cobalt salt and a zinc salt
a nickel salt and a molybdenum salt
a cobalt salt and a molybdenum salt
a nickel salt and a zirconium salt
a cobalt salt and a zirconium salt
a nickel salt and a manganese salt
a cobalt salt and a manganese salt
when reduced with a trialkylaluminum compound.

On the other hand, the following pairs not only do not exhibit synergy but are poorer catalysts than the individual compounds taken alone:
a nickel salt and a lead salt
a nickel salt and a cadmium salt
a nickel salt and a cobalt salt
a nickel salt and a copper salt
when reduced with a trialkylaluminum compound, as far as hydrogenation of olefins or diolefins is concerned.

The following examples illustrate the invention without limiting the scope thereof. They have been carried out in an air-free environment.

EXAMPLE 1

We prepare a catalyst by reacting at 90° C., 5.6 millimoles of triethylaluminum contained in 2.8 milliliters of heptane with a mixture of 1.4 millimole of nickel octoate and 0.35 millimole of iron octoate in 2.8 ml of heptane.

We introduce this catalyst into a reactor containing 100 g of bis phenol A dissolved in 100 g of cyclohexanol. We proceed at 180° C. under a hydrogen pressure of 30 bars.

After 4 hours, we obtain a product which contains, after flash of the cyclohexanol, 99% of propane dicyclohexanol.

EXAMPLE 2 (comparative)

Example 1 is repeated but in the absence of iron octoate and with the use of 3.5 millimoles of nickel octoate. After 5 hours, the conversion rate is only 20% and the catalyst has lost its activity.

EXAMPLE 3 (comparative)

Example 1 is repeated but in the absence of nickel and by using 3.5 millimoles of iron octoate. No reaction occurs which shows that the catalyst is not active.

EXAMPLE 4

The catalyst is prepared by admixing the reaction products, at 90° C., of 3.5 millimoles of nickel octoate dissolved in 5.4 milliliters of heptane with 10.5 millimoles of triethylaluminum dissolved in 5.25 milliliters of heptane on the one hand and of 1.75 millimole of iron octoate dissolved in 3.2 milliliters of heptane with 7 millimoles of triethylaluminum dissolved in 3.5 milliliters of heptane.

The hydrogenation is conducted as in example 1 and, after flash of cyclohexanol, the product contains 99.2% of propane dicyclohexanol.

EXAMPLE 5

We hydrogenate 100 g of bisphenol A dissolved in 100 g of cyclohexanol by injecting into the resulting solution the catalyst obtained by reducing at 90° C., 3.5 millimoles of nickel octoate by means of 10.5 millimoles of triethylaluminum and then, 5 minutes later, by injecting the catalyst obtained by reducing 1.75 millimole of iron octoate by means of 7 millimoles of triethylaluminum. We proceed at 180° C. under a hydrogen pressure of 30 bars. The resulting hydrogenating activity is very low and the conversion, after 5 hours, amounts only to 15%. It appears from this example that too long a delay between the introduction of the nickel catalyst and that of the iron catalyst is detrimental to the catalyst activity.

This example is to be compared with the following example 6.

EXAMPLE 6

We proceed as in example 5, but the iron-containing catalyst is injected less than 1 minute after the nickel-containing catalyst.

After 5 hours, the conversion is complete and, after flash of the cyclohexanol, the resulting product contains 99.3% of propane dicyclohexanol.

EXAMPLE 7

We proceed as in example 5, but the iron catalyst is first injected and, thereafter, the nickel catalyst.

After 5 hours, the conversion is complete and, after flash of the cyclohexanol, the resulting product contains 99.0% of propane dicyclohexanol.

EXAMPLE 8

We proceed as in example 1, except that nickel octoate is replaced by nickel acetylacetonate. After 4 hours, we obtain a product which is withdrawn and, after flash of the cyclohexanol, contains 99% of propane dicyclohexanol.

EXAMPLE 9

We proceed as in example 1, but the catalyst is prepared by reacting 10.9 millimoles of butyllithium with a mixture of 1.4 millimole of nickel octoate and 0.42 millimole of iron octoate. After 6 hours, the resulting product, which is withdrawn, contains, after flash of cyclohexanol, 98% of propane dicyclohexanol.

EXAMPLE 10

We proceed as in example 1, but nickel octoate is replaced by cobalt octoate. After 4 hours, the conversion rate is 20% and the catalyst activity is unchanged.

EXAMPLE 11

We hydrogenate 100 g of phenol in 100 g of cyclohexanol using the catalyst of example 1. After 3 hours of reaction, the reactor outflow contains pure cyclohexanol having a purity degree higher than 99%.

EXAMPLE 12

Example 1 is repeated but, after hydrogenation of bisphenol A, we inject 50 g of cyclododecatriene. The hydrogenation takes place quickly (3 minutes) and cyclododecane is quantitatively obtained. This example shows that the catalyst according to the invention can be used for hydrogenating unsaturated hydrocarbons.

EXAMPLE 13

Example 1 is repeated but with the further addition of 0.35 millimole of cobalt in the form of an octoate solution in 1 milliliter of heptane. A total amount of 6.6 millimoles of triethylaluminum is used.

After 3½ hours of reaction, the resulting product, which is withdrawn, contains, after flash of cyclohexanol, 99% of propane dicyclohexanol.

EXAMPLE 14

In a reactor of a 250 cc capacity containing 100 g of phenol maintained at 155° C., we introduce 10 cc of a catalyst solution in decahydronaphthalene containing the reaction product of 4.5 millimoles of triethylaluminum with a solution containing 1 millimole of nickel octoate and 0.5 millimole of zinc octoate. We proceed under a hydrogen pressure of 30 bars. After 15 minutes, the conversion of phenol to cyclohexanol is higher than 99%.

EXAMPLE 15 (comparative)

We proceed as in example 14 but in the absence of nickel and in the presence of 1.5 millimole of zinc octoate. After 2 hours, no hydrogen has been consumed.

EXAMPLE 15 bis (comparison)

We have repeated example 14, without zinc octoate and using 1.5 millimole of nickel octoate.
After 30 minutes, the conversion was only 20%.

EXAMPLE 16

We proceed as in example 14 except that zinc octoate is replaced by molybdenum stearate. After 15 minutes, more than 99% of the phenol has been converted to cyclohexanol.

EXAMPLE 17 (comparative)

We proceed as in example 15, except that zinc octoate is replaced by molybdenum stearate. After 2 hours, we do not observe any hydrogen consumption.

EXAMPLE 18

We hydrogenate, under the same conditions as precedingly, 20 g of phenol dissolved in 80 g of cyclohexanol, by use of a catalyst obtained by the interaction, in heptane, of 1 millimole of cobalt octoate, 0.5 millimole of iron octoate and 3 millimoles of triethylaluminum. After 3 hours, the effluent contains less than 0.5% by weight of phenol. The cyclohexanol conversion is 99%.

EXAMPLE 19

We hydrogenate 100 g of benzene by means of the catalyst obtained by interaction, in benzene, of 0.5 millimole of cobalt stearate, 0.2 millimole of iron stearate and 2 millimoles of triisobutylaluminum.

We proceed under a hydrogen pressure of 10 bars at a temperature of 155° C.

After 30 minutes, the effluent contains less than 1% of benzene.

The cyclohexane yield amounts to 99%.

EXAMPLE 20

Example 19 is repeated but with the use as catalyst of 0.5 millimoles of nickel octoate, 0.25 millimole of zinc octoate and 2.1 millimoles of triethylaluminum. After 1 hour, the effluent contains less than 1% of benzene. The cyclohexane yield amounts to 99%.

EXAMPLE 21

We proceed as in example 14, but the catalyst is obtained from a solution containing 1 millimole of nickel octoate to which we add successively 3 millimoles of triethylaluminum and then, 0.5 millimole of zinc octoate. After 15 minutes, more than 99% of the phenol have been converted to cyclohexanol.

EXAMPLE 22

We dissolve 100 milliliters of propionitrile into 100 milliliters of benzene. We introduce this mixture into a reactor of a 500 milliliters capacity under an atmosphere free of oxygen and of moisture.

Separately, we prepare the catalyst by reacting 4.8 millimoles of triethylaluminum, dissolved in 2.4 milliliters of heptane, with a mixture of 1.2 millimole of cobalt and 0.4 millimole of zinc octoate, dissolved in 3.2 milliliters of heptane.

We introduce the catalyst when the mixture subjected to hydrogenation is at 160° C. and we introduce such a hydrogen amount as to obtain a total pressure of 30 bars.

The reaction is very fast and, after 1½ hour, the conversion to propylamines is complete. The yield is 99.5%.

EXAMPLES 23 (comparative)

We proceed as in example 22, but we use 1.6 millimole of cobalt octoate without additional zinc salt.
After 3 hours, the conversion is only 85%.

EXAMPLE 23 bis (comparison)

We have repeated example 22, except that we have used 1.6 millimole of zinc octoate and no cobalt octoate.
After 3 hours, no substantial hydrogenation had taken place.

EXAMPLE 24

We proceed as in example 22, except that propionitrile and benzene are replaced by 200 milliliters of oleonitrile. After 1½ hour of reaction, the conversion is complete and the analysis of the resulting product shows an alkalinity rate of 3.62 (expressed in cc of normal HCl per gram of product) and an iodine number of 87.2 (expressed in centigrams per gram of product).

This example shows that the catalyst of the invention is selective for hydrogenating an unsaturated nitrile to the corresponding primary amine.

EXAMPLE 25

We hydrogenate 200 cc of oleonitrile in the presence of a catalyst obtained by reducing 0.6 millimole of nickel octoate and 0.1 millimole of iron octoate with 2.8 millimole of tri-isobutylaluminum. After 1½ hour of reaction, the conversion is complete and the analysis of the effluent shows an alkalinity rate of 3.60 corresponding to the primary amine and an iodine number of 74.6.

EXAMPLE 26 (comparative)

We proceed as in example 25, but with 0.7 millimole of nickel octoate and no iron. After 2 hours of reaction the conversion is complete and the analysis of the resulting product shows an alkalinity of 3.10 and an iodine number of 48.

This example shows that nickel, when used alone, shows a low selectivity for the production of unsaturated primary amine.

EXAMPLE 27

We proceed as in example 25, except that 0.1 millimole of iron octoate is replaced by 0.1 millimole of zirconium octoate. After 1 hour of reaction, the conversion is complete and the analysis of the effluent shows an alkalinity rate of 2.8 and an iodine number of 89.8.

This example shows that the catalyst of the invention is selective for the production of unsaturated secondary amine.

EXAMPLE 27 bis (comparison)

We proceed as in example 25, except that we prepare the catalyst from 0.7 millimole of zirconium octoate (no nickel octoate) and 2.8 millimole of tri-isobutylaluminum.

The conversion was nil.

EXAMPLE 28

We proceed as in example 22, except that zinc octoate is replaced by 0.4 millimole of zirconium octoate.

The reaction is very fast and, after 2 hours of reaction, the conversion to propylamines is complete. The yield is quantitative.

EXAMPLE 28 bis (comparison)

We proceed as in example 28, except that the amount of zirconium octoate is 1.6 millimole and no cobalt is present.

No hydrogenation takes place.

EXAMPLE 29

We have repeated example 22, except that the catalyst was prepared from 1.2 millimole of cobalt octoate, 0.4 millimole of iron octoate and 4.8 millimole of triethylaluminum.

It has taken 2¾ hours to convert all propionitrile to propylamine. The yield was 99%.

EXAMPLE 29 bis (comparison)

We have repeated example 29, except that we have used 1.6 millimole of iron octoate and no cobalt octoate.

After 3 hours, no appreciable reaction had taken place.

EXAMPLE 30 (comparative)

We proceed as in example 24 except that the mixture of cobalt octoate with zinc octoate is replaced by a mixture of 1.2 millimole of nickel octoate with 0.4 millimole of cobalt octoate. After 2 hours of reaction, the conversion is only 80%.

This example shows that the association cobalt-nickel has no significant synergistic effect.

EXAMPLE 31

We proceed as in example 24 but using 100 milliliters of adiponitrile. After 3 hours of reaction, the conversion to hexamethylenediamine is complete.

EXAMPLE 32

We proceed as in example 24, but with the use of a mixture of 1.2 millimole of cobalt octoate and 0.4 millimole of zinc octoate dissolved in 5 millimiters of oleonitrile.

After 1 hour 20 minutes of reaction, the conversion is complete and the analysis of the obtained product shows an alkalinity rate of 3.6 and an iodine number of 87.5.

This example shows that the preparation of the catalyst in a nitrile is not detrimental to the catalyst activity.

EXAMPLE 33

We proceed as in example 22 but with the use of 3.2 milliliters of diisopropylether as solvent for cobalt octoate and zinc octoate.

After 1 h 30' of reaction, the conversion to propylamines is complete. The yield is quantitative.

This example shows that it is possible to obtain active hydrogenation catalysts prepared in the presence of an ether.

EXAMPLE 34

We proceed as in example 1, but with the use of a mixture of 1.8 millimole of nickel octoate and 1.8 millimole of cobalt octoate. After 5 hours, the conversion is only 20% and the catalyst has lost its activity.

This example shows that all the pairs of metal catalysts do not constitute good hydrogenation catalysts.

EXAMPLE 35

We proceed as in example 1 but with the use of 1.4 millimole of nickel acetylacetonate and 0.35 millimole of iron octoate.

After 4 hours, the product, which is withdrawn, contains after flash of cyclohexanol, 99% of propane dicyclohexanol.

This example shows that nickel in the form of acetylacetonate has the same activity as nickel in the form of the octoate.

EXAMPLE 36 (comparison)

200 cc of cyclopentadiene have been introduced into a 500 cc reaction vessel. While maintaining the temperature at 40° C. and the hydrogen partial pressure at 10 bars, there was added a catalytic solution obtained by reacting 1.8 millimole (mM) of triethylaluminum with 0.6 mM of nickel octoate in 6 cc of decahydronaphtalene.

After having stirred the resulting mixture, we have analyzed the mixture at different times and found the results given in Table I.

TABLE I

| Reaction time mn | % molar cyclopentane | % molar cyclopentene | % molar cyclopentadiene |
|---|---|---|---|
| 20 | 2.6 | 44 | 52 |
| 35 | 5 | 63.5 | 30 |
| 50 | 12.4 | 84.5 | 2.1 |

EXAMPLE 37

We have repeated example 36, except that we have substituted the 0.6 mM of nickel octoate with a mixture of 0.48 mM of nickel octoate and 0.12 mM of iron octoate.

After 17 minutes, we have obtained a reaction product containing 9% of cyclopentane, 88% of cyclopentene and 3% of cyclopentadiene.

EXAMPLE 38 (comparison)

We have repeated example 36, except that we have substituted the 0.6 mM of nickel octoate with 0.6 mM of iron octoate.

After 4 hours, the reaction mixture analyzed 3% of cyclopentane, 45% of cyclopentene and 52% of cyclopentadiene.

EXAMPLE 39

We have repeated example 36, except that we have substituted the 0.6 mM of nickel octoate with a mixture of 0.48 mM of nickel octoate and 0.12 mM of manganese octoate.

After 35 minutes, the reaction mixture analyzed 12% of cyclopentane, 86% of cyclopentene and 0.9% of cyclopentadiene.

EXAMPLE 40 (comparison)

We have repeated example 36, except that we have substituted the 0.6 mM of nickel octoate with 0.6 mM of manganese octoate.

After 35 minutes only 20% of cyclopentadiene had been converted.

EXAMPLE 41 (comparison)

We have repeated example 36, except that we have substituted the 0.6 mM of nickel octoate with a mixture of 0.36 mM of nickel octoate and 0.24 mM of cobalt octoate.

We have obtained the following results (Table II).

TABLE II

| Reaction time mn | % molar cyclopentane | % molar cyclopentene | % molar cyclopentadiene |
|---|---|---|---|
| 55 | 6.2 | 79.5 | 12 |
| 120 | 10.5 | 86 | 0.6 |

The results are poorer that when using nickel octoate alone.

We claim:

1. In a process for hydrogenating an hydrogenizable compound having an unsaturated hydrogenatable bond, said compound being an aromatic hydrocarbon, a saturated aldehyde, an unsaturated aldehyde, an unsaturated alcohol, an unsaturated ether, a saturated nitrile, an unsaturated nitrile, an unsaturated amine, a phenol, a polyolefinic hydrocarbon, or vinylacetylene by means of hydrogen, in the homogeneous liquid phase in an inert solvent or in the compound to be hydrogenated in the liquid phase, under hydrogenation conditions at 0°–300° C. and under a pressure of 0.1 to 100 bars, in the presence of a hydrogenation catalyst, said catalyst being soluble in heptane in catalytic quantities and obtained by reacting a metal compound with a reducing agent of the formula Al $R_3$ wherein each R is an alkyl group of 1–12 carbon atoms, the improvement wherein said metal compound is used as a mixture in synergistic proportions, of (a) at least one alkoxide, acetylacetonate or carboxylate of a metal selected from iron, zinc, zirconium, manganese and molybdenum and (b) at least one alkoxide, acetylacetonate or carboxylate of a metal selected from nickel and cobalt, the ratio of the atomic amount of metal (a) to metal (b) being within about 10:1 to 0.01:1, and the process being conducted under such conditions that the rate of hydrogenation is disproportionately higher compared to the use of (a) or (b) compound taken alone.

2. A process according to claim 1, wherein the compound (a) is an iron compound.

3. A process according to claim 1, wherein the compound (a) is a zirconium compound.

4. A process according to claim 1, wherein the compound (a) is a molybdenum compound.

5. A process according to claim 1, wherein the compounds (a) and (b) are carboxylates.

6. A process according to claim 1, wherein the compounds (a) and (b) are acetylacetonates.

7. A process according to claim 1, wherein the atomic ratio of the amount of metal compound (a) to that of metal compound (b) is from 0.05:1 to 5:1.

8. A process according to claim 1, wherein the ratio of the number of gram-molecules of the reducing agent to the total number of gram-atoms of the metals of the (a) and (b) compounds is from 0.5:1 to 10:1.

9. A process according to claim 1, wherein the ratio of the number of gram-molecules of the reducing agent to the total number of gram-atoms of the metals of the (a) and (b) compounds is from 1.5:1 to 6:1.

10. A process according to claim 1, wherein the hydrogenizable compound is cyclopentadiene or cyclododecatiene.

11. A process according to claim 1, wherein the hydrogenizable compound is bis-phenol A, phenol, or benzene.

12. A process according to claim 1 wherein the hydrogenizable compound is a nitrile which is hydrogenated to an amine.

13. A process according to claim 1, wherein metal (a) is iron and metal (b) is nickel.

14. A process according to claim 1, wherein metal (a) is zirconium and metal (b) is nickel.

15. A process according to claim 1, wherein metal (a) is zirconium and metal (b) is cobalt.

16. A process according to claim 1, wherein metal (a) is molybdenum and metal (b) is nickel.

17. A process according to claim 1, wherein metal (a) is zinc and metal (b) is nickel.

18. A process according to claim 1, wherein metal (a) is iron and metal (b) is cobalt.

19. A process according to claim 1, wherein metal (a) is zinc and metal (b) is cobalt.

20. A process according to claim 1, wherein metal (a) is manganese and metal (b) is nickel.

21. A process according to claim 1, wherein said unsaturated bond is a carbon to carbon or carbon to nitrogen bond.

* * * * *